US011732073B2

(12) United States Patent
Hattori et al.

(10) Patent No.: US 11,732,073 B2
(45) Date of Patent: Aug. 22, 2023

(54) FLUORINATED ELASTIC COPOLYMER, ITS COMPOSITION AND CROSSLINKED RUBBER ARTICLE

(71) Applicant: AGC Inc., Chiyoda-ku (JP)

(72) Inventors: Yukiko Hattori, Chiyoda-ku (JP); Takeshi Yamada, Chiyoda-ku (JP); Takehiro Kose, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/705,441

(22) Filed: Dec. 6, 2019

(65) Prior Publication Data

US 2020/0109227 A1    Apr. 9, 2020

Related U.S. Application Data

(63) Continuation of application No. PCT/JP2018/025073, filed on Jul. 2, 2018.

(30) Foreign Application Priority Data

Jul. 5, 2017    (JP) ................................. 2017-131931

(51) Int. Cl.
*C08F 214/26* (2006.01)
*C08F 14/26* (2006.01)
*C08K 5/00* (2006.01)
*C08F 2/38* (2006.01)

(52) U.S. Cl.
CPC ............ *C08F 214/262* (2013.01); *C08F 2/38* (2013.01); *C08F 14/26* (2013.01); *C08K 5/0025* (2013.01); *C08F 2800/10* (2013.01); *C08F 2810/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,310,606 A * | 3/1967 | Fritz | ........................ | C08F 16/24 525/276 |
| 6,730,760 B2 * | 5/2004 | Grootaert | ................ | C08F 14/26 525/326.3 |
| 8,877,870 B2 * | 11/2014 | Funaki | ................... | C08F 214/26 525/326.4 |
| 10,023,671 B2 * | 7/2018 | Toyoda | ............. | C08F 216/1416 |
| 2003/0119993 A1 * | 6/2003 | Apostolo | ............... | C08F 236/20 525/326.2 |
| 2006/0025529 A1 | 2/2006 | Apostolo et al. | | |
| 2007/0123672 A1 * | 5/2007 | Funaki | ..................... | C08L 27/12 526/247 |
| 2011/0207889 A1 * | 8/2011 | Kose | .......................... | C08J 3/24 525/326.3 |
| 2013/0129954 A1 | 5/2013 | Lochhaas et al. | | |
| 2016/0137572 A1 * | 5/2016 | Yamamoto | .............. | C07C 43/29 568/643 |
| 2016/0137809 A1 * | 5/2016 | Kunimoto | ............ | C08K 5/0025 525/123 |
| 2016/0208033 A1 | 7/2016 | Toyoda et al. | | |
| 2018/0148527 A1 * | 5/2018 | Yagi | ......................... | C08K 5/14 |

FOREIGN PATENT DOCUMENTS

| | | | | |
|---|---|---|---|---|
| EP | 1808448 A1 * | 7/2007 | .......... | C08F 214/265 |
| GB | 1106343 A * | 3/1968 | ............. | C08F 16/24 |
| JP | 2524123 B2 | 5/1996 | | |
| JP | 2013-532766 A | 8/2013 | | |
| JP | 5290494 B2 | 9/2013 | | |
| JP | 2017193682 A * | 10/2017 | ............. | F16C 29/02 |
| WO | WO 2010/082633 A1 | 7/2010 | | |
| WO | WO 2015/080002 A1 | 6/2015 | | |

OTHER PUBLICATIONS

International Search Report dated Sep. 18, 2018 in PCT/JP2018/025073 filed on Jul. 2, 2018, 3 pages.

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

To provide a fluorinated elastic copolymer and a fluorinated elastic copolymer composition, whereby it is possible to obtain a crosslinked rubber article which has practically sufficient rubber physical properties and which is, at the same time, excellent in low-temperature characteristics; a crosslinked rubber article; and a method for producing a fluorinated elastic copolymer. The fluorinated elastic copolymer comprises units based on tetrafluoroethylene, units based on $CF_2\!=\!CFOR^{f1}$ ($R^{f1}$ is a $C_{1\text{-}10}$ perfluoroalkyl group), units based on $CF_2\!=\!CF(OCF_2CF_2)_n\!-\!(OCF_2)_m\!-\!OR^{f2}$ ($R^{f2}$ is a $C_{1\text{-}4}$ perfluoroalkyl group, n is an integer of from 0 to 3, m is an integer of from 0 to 4, and n+m is an integer of from 1 to 7), and units based on a fluorinated monomer having at least two polymerizable unsaturated bonds.

16 Claims, No Drawings

FLUORINATED ELASTIC COPOLYMER, ITS COMPOSITION AND CROSSLINKED RUBBER ARTICLE

TECHNICAL FIELD

The present invention relates to a fluorinated elastic copolymer, a fluorinated elastic copolymer composition, a crosslinked rubber article, and a method for producing a fluorinated elastic copolymer.

BACKGROUND ART

A crosslinked rubber article obtained by crosslinking a fluorinated elastic copolymer, is excellent in heat resistance, chemical resistance, oil resistance, weather resistance, etc. and thus has been used in applications under severe environments where a general purpose rubber cannot be used.

The following one is known as a fluorinated elastic copolymer which is excellent in crosslinkability and has sufficient storage modulus and which has good rubber physical properties (tensile strength, elongation at break, etc.) when made into a crosslinked rubber article.

A fluorinated elastic copolymer having iodine atoms at its molecular terminals and having units (a) based on tetrafluoroethylene, units (b) based on a fluorinated monomer having one polymerizable unsaturated bond (but excluding tetrafluoroethylene) and units (c) based on a fluorinated monomer having at least two polymerizable unsaturated bonds, wherein the molar ratio of the units (a)/the units (b) is from 40/60 to 90/10, and the proportion of the units (c) to the total amount of the units (a) and the units (b) is from 0.01 to 1 mol % (Patent Document 1).

However, a cross-linked rubber article obtained by crosslinking the fluorinated elastic copolymer as disclosed in Patent Document 1, is poor in the rubber physical properties at low temperatures (hereinafter referred to also as low-temperature characteristics).

As a fluorinated elastic copolymer (perfluoroelastomer) having the glass transition temperature (hereinafter referred to also as Tg) as an index for low temperature characteristics, made to be low, the following one has been proposed.

A perfluoroelastomer having units (a) based on tetrafluoroethylene, units (b) based on a compound represented by the following formula (1) and units (c) based on a compound represented by the following formula (2) (Patent Document 2).

wherein $R^{f1}$ is a $C_{1-10}$ perfluoroalkyl group.

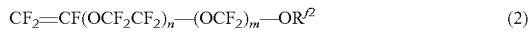

wherein $R^{f2}$ is a $C_{1-4}$ perfluoroalkyl group, n is an integer of from 0 to 3, m is an integer of from 0 to 4, and n+m is an integer of from 1 to 7.

PRIOR ART DOCUMENTS

Patent Documents

Patent Document 1: WO2010/082633
Patent Document 2: WO2015/080002

DISCLOSURE OF INVENTION

Technical Problem

Recently, further improvement in low-temperature characteristics of a crosslinked rubber article is required, so as to be durable in use under more severe environments. For example, for a crosslinked rubber article, it is required that in a low-temperature elasticity recovery test (TR test) to obtain the temperature at which its specimen once frozen at a low temperature (−70 to −73° C.) in an extended state reaches a certain shrinkage by recovering the elasticity along with an increase of the temperature, the temperature at which the shrinkage reaches 10% (hereinafter referred to as TR10) is sufficiently low.

However, with the perfluoroelastomer as disclosed in Patent Document 2, although Tg is made to be low, TR10 when it is made into a crosslinked rubber article, cannot be lowered to the level required, and thus, the low-temperature characteristics when made into a crosslinked rubber article, are still insufficient.

The present invention is to provide a fluorinated elastic copolymer and a fluorinated elastic copolymer composition, whereby it is possible to obtain a crosslinked rubber article which has practically sufficient rubber physical properties and which is, at the same time, excellent in low-temperature characteristics; a crosslinked rubber article which has practically sufficient rubber physical properties and which is, at the same time, excellent in low-temperature characteristics; and a method for producing a fluorinated elastic copolymer, whereby it is possible to obtain a crosslinked rubber article which has practically sufficient rubber physical properties and which is, at the same time, excellent in low-temperature characteristics.

Solution to Problem

The present inventors have intensively studied low-temperature characteristics of a crosslinked rubber article obtained by crosslinking a fluorinated elastic copolymer, and as a result, they have surprisingly found it possible to make TR10 of a crosslinked rubber article to be sufficiently low by combining, in the fluorinated elastic copolymer, units based on a compound represented by the formula (2), which are considered to contribute to lowering of Tg, and units based on a fluorinated monomer having at least two polymerizable unsaturated bonds, which are considered not to contribute to the low-temperature characteristics, and thus have arrived at the present invention.

The present invention has the following embodiments.
<1> A fluorinated elastic copolymer comprising units based on tetrafluoroethylene, units based on a compound represented by the following formula (1), units based on a compound represented by the following formula (2), and units based on a fluorinated monomer having at least two polymerizable unsaturated bonds:

wherein $R^{f1}$ is a $C_{1-10}$ perfluoroalkyl group,

wherein $R^{f2}$ is a $C_{1-4}$ perfluoroalkyl group, n is an integer of from 0 to 3, m is an integer of from 0 to 4, and n+m is an integer of from 1 to 7.
<2> The fluorinated elastic copolymer according to <1>, which further contains iodine atoms.
<3> The fluorinated elastic copolymer according to <1> or <2>, wherein to the total of all units in the fluorinated elastic copolymer, the proportion of the above units based on tetrafluoroethylene is from 35 to 75 mol %, the proportion of the above units based on a compound represented by the formula (1) is from 3 is to 57 mol %, the proportion of the above units based on a compound represented by the formula (2) is from 3 to 57 mol %, and the proportion of the above units based on a fluorinated monomer having at least two polymerizable unsaturated bonds is from 0.01 to 1 mol %.

<4> The fluorinated elastic copolymer according to any one of <1> to <3>, wherein the molar ratio of the above units based on tetrafluoroethylene to the above units based on a compound represented by the formula (1) is from 35/65 to 90/10.

<5> The fluorinated elastic copolymer according to any one of <1> to <4>, which contains iodine atoms in an amount of from 0.01 to 1.5 mass % in 100 mass % of the fluorinated elastic copolymer.

<6> The fluorinated elastic copolymer according to any one of <1> to <5>, wherein the fluorinated monomer having at least two polymerizable unsaturated bonds is a compound represented by the following formula (3):

$$CF_2=CFOR^{f3}OCF=CF_2 \quad (3)$$

wherein $R^{f3}$ is a $C_{1-25}$ perfluoroalkylene group or a group having at least one etheric oxygen atom between carbon-carbon atoms in a $C_{2-25}$ perfluoroalkylene group.

<7> The fluorinated elastic copolymer according to any one of <1> to <6>, of which the storage modulus G' is from 100 to 600 kPa, and Tg is from −40 to −15° C.

<8> A fluorinated elastic copolymer composition comprising the fluorinated elastic copolymer as defined in any one of <1> to <7> and a crosslinking agent.

<9> The fluorinated elastic copolymer composition according to <8>, which contains the crosslinking agent in an amount of from 0.3 to 10 parts by mass to 100 parts by mass of the fluorinated elastic copolymer.

<10> The fluorinated elastic copolymer composition according to <8> or <9>, wherein the crosslinking agent is an organic peroxide.

<11> A crosslinked rubber article obtained by crosslinking the fluorinated elastic copolymer as defined in any one of <1> to <7>, or the fluorinated elastic copolymer composition as defined in any one of <8> to <10>.

<12> The crosslinked rubber article according to <11>, of which the tensile strength at break is at least 5 MPa, the elongation at break is at least 100%, and TR10 is at most −10° C.

<13> A method for producing a fluorinated elastic copolymer, which comprises polymerizing monomer components comprising tetrafluoroethylene, a compound represented by the following formula (1), a compound represented by the following formula (2) and a fluorinated monomer having at least two polymerizable unsaturated bonds, in the presence of a radical polymerization initiator:

$$CF_2=CFOR^{f1} \quad (1)$$

wherein $R^{f1}$ is a $C_{1-10}$ perfluoroalkyl group, $$CF_2=CF(OCF_2CF_2)_n-(OCF_2)_m-OR^{f2} \quad (2)$$

wherein $R^{f2}$ is a $C_{1-4}$ perfluoroalkyl group, n is an integer of from 0 to 3, m is an integer of from 0 to 4, and n+m is an integer of form 1 to 7.

<14> The method for producing a fluorinated elastic copolymer according to <13> wherein said monomer components are polymerized in the presence of said radical polymerization initiator and a compound represented by the following formula (4), $$R^{f4}I_2 \quad (4)$$

wherein $R^{f4}$ is a $C_{1-16}$ polyfluoroalkylene group.

<15> The method for producing a fluorinated elastic copolymer according to <13> or <14>, wherein said monomer components are polymerized in an aqueous medium containing an emulsifier.

Advantageous Effects of Invention

According to the fluorinated elastic copolymer of the present invention, it is possible to obtain a crosslinked rubber article which has practically sufficient rubber physical properties and which is, at the same time, excellent in low-temperature characteristics.

According to the fluorinated elastic copolymer composition of the present invention, it is possible to obtain a crosslinked rubber article which has practically sufficient rubber physical properties and which is, at the same time, excellent in low-temperature characteristics.

The crosslinked rubber article of the present invention has practically sufficient rubber physical properties and at the same time, is excellent in low-temperature characteristics.

According to the method for producing a fluorinated elastic copolymer of the present invention, it is possible to produce a fluorinated elastic copolymer whereby it is possible to obtain a crosslinked rubber article which has practically sufficient rubber physical properties and which is, at the same time, excellent in low-temperature characteristics.

DESCRIPTION OF EMBODIMENTS

In this specification, the meanings of terms, and the manner of description, are as follows.

A "unit" in a copolymer means an atomic group derived from one molecule of a monomer, formed by polymerization of the monomer. A unit may be an atomic group directly formed by the polymerization reaction of the monomer, or may be an atomic group having a part of said atomic group converted to another structure by treating the polymer.

An "etheric oxygen atom" is meant for an oxygen atom to form an etheric bond (—O—) between carbon-carbon atoms.

The "pressure unit (MPa)" is a "gauge pressure" unless otherwise specified.

The expression "to" for showing a numerical range is meant to include the numerical values given before and after the expression as the lower limit value and the upper limit value.

A "compound represented by the formula (1)" may be referred to as a "compound (1)". "Compounds represented by other formulae" may also be referred to in the same manner.

<Fluorinated Elastic Copolymer>

The fluorinated elastic copolymer of the present invention has units (hereinafter referred to also as TFE units) based on tetrafluoroethylene (hereinafter referred to also as TFE), units (hereinafter referred to also as PAVE units) based on the later-described compound (1), units (hereinafter referred to also as POAVE units) based on the later-described compound (2) and, units (hereinafter referred to also as DVE units) based on a fluorinated monomer having at least two polymerizable unsaturated bonds. The fluorinated elastic copolymer of the present invention may further have units based on other monomers as the case requires, within a range not to impair the effects of the present invention.

PAVE units are units based on compound (1).

$$CF_2=CFOR^{f1} \quad (1)$$

wherein $R^{f1}$ is a $C_{1-10}$ perfluoroalkyl group.

In $R^{f1}$, the perfluoroalkyl group may be linear or may be branched. The number of carbon atoms in $R^{f1}$ is preferably from 1 to 5, more preferably from 1 to 3, from such a viewpoint that the productivity of the fluorinated elastic copolymer will be improved.

As specific examples of the compound (1), the following ones may be mentioned. Here, the expression in the parentheses following the formula is an abbreviation for the compound.

$CF_2=CFOCF_3$(PMVE), $CF_2=CFOCF_2CF_3$ (PEVE), $CF_2=CFOCF_2CF_2CF_3$ (PPVE), $CF_2=CFOCF_2CF_2CF_2CF_3$

As the compound (1), from such a viewpoint that the productivity of the fluorinated elastic copolymer will be improved, PMVE, PEVE or PPVE is preferred.

POAVE units are units based on compound (2).

wherein $R^{f2}$ is a $C_{1-4}$ perfluoroalkyl group, n is an integer of from 0 to 3, m is an integer of from 0 to 4, and n+m is an integer of from 1 to 7.

In $R^{f2}$, the perfluoroalkyl group may be linear or may be branched. The number of carbon atoms in $R^{f2}$ is preferably from 1 to 3.

When n is 0, m is preferably 3 or 4. When n is 1, m is preferably an integer of from 2 to 4. When n is 2 or 3, m is preferably 0. n is preferably an integer of from 1 to 3.

When the number of carbon atoms in $R^{f2}$, n and m are within the above ranges, the low-temperature characteristics will be further excellent when the fluorinated elastic copolymer is made into a crosslinked rubber article, and also, the productivity of the fluorinated elastic copolymer will be improved.

As specific examples of the compound (2), the following ones may be mentioned. Here, the expression in the parentheses following the formula is an abbreviation for the compound.

$CF_2=CF-OCF_2CF_2-(OCF_2)_4-OCF_3$(C9PEVE),
$CF_2=CF-OCF_2CF_2-(OCF_2)_2-OCF_3$(C7PEVE),
$CF_2=CF-(OCF_2CF_2)_2-OCF_2CF_3$(EEAVE),
$CF_2=CF-(OCF_2CF_2)_3-OCF_2CF_3$(EEEAVE),
$CF_2=CF-OCF_2-OCF_3$, $CF_2=CF-OCF_2-OCF_2-OCF_3$

As the compound (2), from such a viewpoint that the low-temperature characteristics will be further excellent when the fluorinated elastic copolymer is made into a crosslinked rubber article, and productivity of the fluorinated elastic copolymer will be improved, C9PEVE, C7PEVE, EEAVE or EEEAVE is preferred.

Here, these compounds may be produced by the method described in WO00/56694 by using the corresponding alcohols as raw materials.

DVE units are units based on a fluorinated monomer having at least two polymerizable unsaturated bonds.

As the polymerizable unsaturated bond, a double bond (C=C), a triple bond (C≡C), etc. between carbon-carbon atoms, may be mentioned, and a double bond is preferred. The number of the polymerizable unsaturated bonds is preferably from 2 to 6, more preferably 2 or 3, particularly preferably 2.

The fluorinated monomer having at least two polymerizable unsaturated bonds is preferably a perfluoro compound.

As the fluorinated monomer having at least two polymerizable unsaturated bonds, compound (3) is preferred from such a viewpoint that low temperature characteristics (TR10) will be further excellent while maintaining the rubber physical properties when the fluorinated elastic copolymer is made into a crosslinked rubber article.

$CF_2=CFOR^{f3}OCF=CF_2$ (3)

wherein $R^{f3}$ is a $C_{1-25}$ perfluoroalkylene group or a group having at least one etheric carbon atom between carbon-carbon atoms in a $C_{2-25}$ perfluoroalkylene group.

In $R^{f3}$, the perfluoroalkylene group may be linear or may be branched. The number of carbon atoms in $R^{f3}$ is preferably 3 or 4 from such a viewpoint that low temperature characteristics (TR10) will be further excellent while maintaining the rubber physical properties when the fluorinated elastic copolymer is made into a crosslinked rubber article.

As specific examples of the compound (3), the following ones may be mentioned. Here, the expression in the parentheses following the formula is an abbreviation for the compound.

$CF_2=CFO(CF_2)_2OCF=CF_2$,
$CF_2=CFO(CF_2)_3OCF=CF_2$(C3DVE),
$CF_2=CFO(CF_2)_4OCF=CF_2$(C4DVE),
$CF_2=CFO(CF_2)_6OCF=CF_2$,
$CF_2=CFO(CF_2)_8OCF=CF_2$,
$CF_2=CFO(CF_2)_2OCF(CF_3)CF_2OCF=CF_2$,
$CF_2=CFO(CF_2)_2O(CF(CF_3)CF_2O)_2CF=CF_2$,
$CF_2=CFOCF_2O(CF_2CF_2O)_2CF=CF_2$,
$CF_2=CFO(CF_2O)_3O(CF(CF_3)CF_2O)_2CF=CF_2$,
$CF_2=CFOCF_2CF(CF_3)O(CF_2)OCF(CF_3)CF_2OCF=CF_2$
$CF_2=CFOCF_2CF_2O(CF_2O)_2CF_2CF_2OCF=CF_2$

As the compound (3), C3DVE or C4DVE is particularly preferred from such a viewpoint that low temperature characteristics (TR10) will be further excellent while maintaining the rubber physical properties when the fluorinated elastic copolymer is made into a crosslinked rubber article.

Units (e) are units based on another monomer (i.e. a monomer other than TFE, the compound (1), the compound (2) and the compound (3)).

Another monomer may be a monomer having fluorine atoms and a halogen atom other than a fluorine atom (bromotrifluoroethylene, iodotrifluoroethylene, etc.), or a monomer having fluorine atoms and a nitrile group ($CF_2=CFO(CF_2)_5CN$, perfluoro(8-cyano-5-methyl-3,6-dioxa-1-octene), etc.).

The molar ratio of TFE units to PAVE units (TFE units/PAVE units) is preferably from 35/65 to 90/10, more preferably from 60/40 to 85/15, further preferably from 65/35 to 85/15.

The proportion of TFE units is preferably from 35 to 75 mol %, more preferably from 40 to 75 mol %, further preferably from 55 to 75 mol %, in all units (100 mol %) constituting the fluorinated elastic copolymer.

The proportion of PAVE units is preferably from 3 to 57 mol %, more preferably from 5 to 50 mol %, further preferably from 10 to 40 mol %, in all units (100 mol %) constituting the fluorinated elastic copolymer.

The proportion of POAVE units is preferably from 1 to 57 mol %, more preferably from 2 to 30 mol %, further preferably from 2 to 20 mol %, in all units (100 mol %) constituting the fluorinated elastic copolymer.

The proportion of DVE units is preferably from 0.01 to 1 mol %, more preferably from 0.05 to 0.5 mol %, further preferably from 0.05 to 0.3 mol %, in all units (100 mol %) constituting the fluorinated elastic copolymer.

The proportion of units (e) is preferably from 0 to 5 mol %, more preferably from 0 to 3 mol %, further preferably from 0 to 2 mol %, in all units (100 mol %) constituting the fluorinated elastic copolymer.

When the proportions of TFE units, PAVE units, POAVE units, DVE units and units (e) are within the above ranges, low temperature characteristics (TR10) will be further excellent while maintaining the rubber physical properties when the fluorinated elastic copolymer is made into a crosslinked rubber article.

The fluorinated elastic copolymer of the present invention preferably further contains iodine atoms from such a viewpoint that crosslinkability of the fluorinated elastic copolymer will be excellent and also rubber physical properties of the crosslinked rubber article will be further excellent. The iodine atoms are preferably bonded to terminals of a polymer chain of the fluorinated elastic copolymer. The terminals of a polymer chain are the concept including both terminals of the main chain and terminals of branched chains.

A method for incorporating iodine atoms may be a method of introducing units containing iodine into the fluorinated elastic copolymer of the present invention by using a monomer containing iodine such as iodotrifluoroethylene for units (e), or a method of using a chain transfer agent containing iodine, such as later-described compound (4) or (5).

The content of iodine atoms is preferably from 0.01 to 1.5 mass %, more preferably from 0.01 to 1.0 mass %, in the fluorinated elastic copolymer (100 mass %). When the content of iodine atoms is within the above range, crosslinkability of the fluorinated elastic copolymer will be further excellent, and also rubber physical properties of the crosslinked rubber article will be further excellent.

The storage elastic modulus G' of the fluorinated elastic copolymer is preferably from 100 to 600 kPa, more preferably from 200 to 500 kPa, further preferably from 200 to 400 kPa. The storage elastic modulus G' is an index for the average molecular weight, i.e. it being high indicates a high molecular weight, and it being low indicates a low molecular weight. When the storage elastic modulus G' of the fluorinated elastic copolymer is within the above range, processability of the fluorinated elastic copolymer will be excellent, and also rubber physical properties will be excellent when formed into a crosslinked rubber article.

Tg of the fluorinated elastic copolymer is preferably from −40 to −15° C., more preferably from −40 to −20° C. When Tg of the fluorinated elastic copolymer is within the above range, low-temperature characteristics when the fluorinated elastic copolymer is made into a crosslinked rubber article, will be further excellent.

Since the fluorinated elastic copolymer of the present invention as described above has TFE units, PAVE units, POAVE units and DVE units, it is possible to obtain a crosslinked rubber article which has practically sufficient rubber properties and which is also excellent in low-temperature characteristics.

That is, by combining POAVE units and DVE units, as compared with the fluorinated elastic copolymer described in Patent Document 2 having no DVE units, TR10 becomes sufficiently low when made into a crosslinked rubber article, and low-temperature characteristics will be excellent.

Further, only with TFE units, PAVE units and POAVE units, the storage elastic modulus of the fluorinated elastic copolymer, and the rubber physical properties (tensile strength, etc.), heat resistance, etc. when made into a crosslinked rubber article, tend to be insufficient, but, by adding DVE units, it becomes to have a practically sufficient rubber properties when made into a crosslinked rubber article.

<Method for Producing Fluorinated Elastic Copolymer>

The method for producing a fluorinated elastic copolymer of the present invention, is a method of polymerizing monomer components comprising TFE, the compound (1), the compound (2) and the fluorinated monomer having at least two polymerizable unsaturated bonds in the presence of a radical polymerization initiator.

As the polymerization method, a radical polymerization method is preferred.

As the radical polymerization initiating source, a radical polymerization initiator, heat, irradiation of ionizing radiation, etc. may be mentioned, and from such a viewpoint that productivity of the fluorinated elastic copolymer will be excellent, a radical polymerization initiator is preferred.

As the radical polymerization initiator, a known one may be used.

As the radical polymerization initiator to be used in the emulsion polymerization to be described later, preferred is a water-soluble initiator. The water-soluble initiator may be a persulfate (ammonium persulfate, sodium persulfate, potassium persulfate, etc.), hydrogen peroxide, a water-soluble organic peroxide (disuccinic acid peroxide, diglutaric acid peroxide, tert-butyl hydroxyperoxide, etc.), an organic initiator (azobisisobutylamidine dihydrochloride, etc.), a redox initiator made of a combination of a persulfate or hydrogen peroxide, and a reducing agent such as sodium hydrogen bisulfite, sodium thiosulfate or the like, an inorganic initiator of a system letting a small amount of iron, ferrous salt, silver sulfate or the like be coexistent with a redox initiator, etc.

The amount of the radical polymerization initiator is preferably from 0.0001 to 5 parts by mass, more preferably from 0.001 to 2 parts by mass, to 100 parts by mass of the monomer components.

In the case of using a radical polymerization initiator, it is preferred to polymerize the monomer components in the presence of a chain transfer agent.

The chain transfer agent may be an alcohol (methanol, ethanol, etc.), a chlorofluorohydrocarbon (1,3-dichloro-1,1,2,2,3-pentafluoropropane, 1,1-dichloro-1-fluoroethane, etc.), a hydrocarbon (pentane, hexane, cyclohexane, etc.), compound (4), compound (5), a mercaptan (tert-dodecyl mercaptan, n-octadecyl mercaptan, etc.), etc.

$$R^{f4}I_2 \qquad (4)$$

$$R^{f4}IBr \qquad (5)$$

wherein $R^{f4}$ is a $C_{1-16}$ polyfluoroalkylene group.

In $R^{f4}$, the polyfluoroalkylene group may be linear or may be branched. As $R^{f4}$, a perfluoroalkylene group is preferred.

As the chain transfer agent, the compound (4) is preferred, since crosslinkability of the fluorinated elastic copolymer will be excellent, and rubber physical properties of the cross-linked rubber article will be further excellent.

The compound (4) may be 1,4-diiodoperfluorobutane, 1,6-diiodoperfluorohexane, 1,8-diiodoperfluorooctane, etc., and from the viewpoint of excellent polymerization reactivity, 1,4-diiodoperfluorobutane is preferred.

The amount of the chain transfer agent is suitably set based on the chain transfer constant of the chain transfer agent. In the case of using the compound (4), the amount is preferably from 0.01 to 5 mass %, more preferably from 0.05 to 2 mass %, to 100 parts by mass of the monomer components.

As the polymerization method, an emulsion polymerization method, a solution polymerization method, a suspension polymerization method, a bulk polymerization method or the like, may be mentioned, and from the viewpoint of adjustment of the molecular weight and copolymer composition, and excellent productivity, an emulsion polymerization method is preferred.

In the emulsion polymerization method, the monomer components are polymerized in an aqueous medium containing an emulsifier.

As the aqueous medium, water or a mixture of water and a water-soluble organic solvent may be mentioned.

The water-soluble organic solvent may be tert-butanol, propylene glycol, dipropylene glycol, dipropylene glycol monomethyl ether, tripropylene glycol, etc., and from such a viewpoint that the polymerization rate of monomers will not be lowered, tert-butanol, or dipropylene glycol monomethyl ether is preferred.

When the aqueous medium contains a water-soluble organic solvent, dispersibility of monomers and dispersibility of the fluorinated elastic copolymer will be excellent, and productivity of the fluorinated elastic copolymer will be excellent.

The content of the water-soluble organic solvent is preferably from 1 to 40 parts by mass, more preferably from 3 to 30 parts by mass, to 100 parts by mass of water.

The emulsifier may be an anionic emulsifier, a nonionic emulsifier, a cationic emulsifier, etc., and from such a viewpoint that mechanical and chemical stability of the latex will be further excellent, an anionic emulsifier is preferred.

The anionic emulsifier may be a hydrocarbon emulsifier (sodium lauryl sulfate, sodium dodecylbenzene sulfonate, etc.), a fluorinated emulsifier (ammonium perfluorooctanoate, sodium perfluorooctanoate, ammonium perfluorohexanoate, compound (6), etc.), etc.

$$F(CF_2)_pO(CF(X)CF_2O)_qCF(Y)COOA \quad (6)$$

wherein X and Y are each a fluorine atom or a $C_{1-3}$ linear or branched perfluoroalkyl group, A is a hydrogen atom, an alkali metal or $NH_4$, p is an integer of from 2 to 10, and q is an integer of from 0 to 3.

As the compound (6), the following ones may be mentioned.

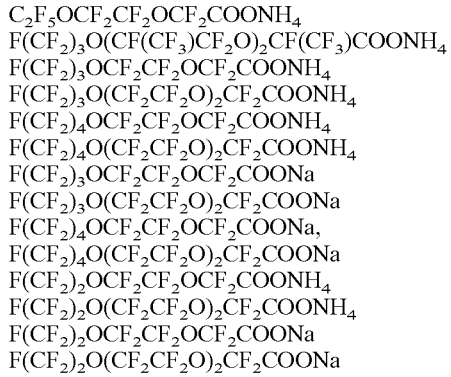

$C_2F_5OCF_2CF_2OCF_2COONH_4$
$F(CF_2)_3O(CF(CF_3)CF_2O)_2CF(CF_3)COONH_4$
$F(CF_2)_3OCF_2CF_2OCF_2COONH_4$
$F(CF_2)_3O(CF_2CF_2O)_2CF_2COONH_4$
$F(CF_2)_4OCF_2CF_2OCF_2COONH_4$
$F(CF_2)_4O(CF_2CF_2O)_2CF_2COONH_4$
$F(CF_2)_3OCF_2CF_2OCF_2COONa$
$F(CF_2)_3O(CF_2CF_2O)_2CF_2COONa$
$F(CF_2)_4OCF_2CF_2OCF_2COONa$,
$F(CF_2)_4O(CF_2CF_2O)_2CF_2COONa$
$F(CF_2)_2OCF_2CF_2OCF_2COONH_4$
$F(CF_2)_2O(CF_2CF_2O)_2CF_2COONH_4$
$F(CF_2)_2OCF_2CF_2OCF_2COONa$
$F(CF_2)_2O(CF_2CF_2O)_2CF_2COONa$

As the anionic emulsifier, ammonium perfluorooctanoate, $C_2F_5OCF_2CF_2OCF_2COONH_4$, $F(CF_2)_4CF_2CF_2OCF_2COONH_4$ or $F(CF_2)_3OCF_2CF_2OCF_2COONH_4$ is preferred.

The amount of the emulsifier is preferably from 0.01 to 15 parts by mass, more preferably from 0.1 to 10 parts by mass, to 100 parts by mass of the aqueous medium.

A latex containing a fluorinated elastic copolymer is obtainable by the emulsion polymerization method. The fluorinated elastic copolymer may be separated from the latex by coagulation.

As the coagulation method, a method by addition of a metal salt, addition of an inorganic acid (hydrochloric acid, etc.), mechanical shear or freeze thawing, may be mentioned.

The polymerization conditions for the radical polymerization are suitably selected depending on the monomer composition, the decomposition temperature of the radical polymerization initiator, etc.

The polymerization pressure is preferably from 0.1 to 20 MPa, more preferably from 0.3 to 10 MPa, further preferably from 0.3 to 5 MPa. The polymerization temperature is preferably from 0 to 100° C., more preferably from 10 to 90° C., further preferably from 20 to 80° C. The polymerization time is preferably from 1 to 72 hours, more preferably from 1 to 24 hours, further preferably from 1 to 12 hours.

In the method for producing a fluorinated elastic copolymer of the present invention as described above, in the presence of a radical polymerization initiator, monomer components comprising TFE, the compound (1), the compound (2) and the fluorinated monomer having at least two polymerizable unsaturated bonds are polymerized, whereby it is possible to produce a fluorinated elastic copolymer capable of obtaining a crosslinked rubber article which has practically sufficient rubber physical properties and which is also excellent in low-temperature characteristics.

<Fluorinated Elastic Copolymer Composition>

The fluorinated elastic copolymer composition of the present invention comprises a fluorinated elastic copolymer of the present invention and a crosslinking agent. The fluorinated elastic copolymer composition of the present invention may contain a crosslinking aid, other additives, etc., as the case requires, within a range not to impair the effects of the present invention.

The crosslinking agent may be an organic peroxide, a polyol, an amine, triazine, etc., and an organic peroxide is preferred from such a viewpoint that the productivity, heat resistance and chemical resistance of the crosslinked rubber article will be excellent.

The organic peroxide may be a dialkyl peroxide (di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy)hexane, 2,5-dimethyl-2,5-di(tert-butylperoxy) hexane-3, etc.), 1,1-di(tert-butylperoxy)-3,3,5-trimethylcyclohexane, 2,5-dimethylhexane-2,5-dihydro peroxide, benzoyl peroxide, tert-butylperoxy benzene, 1,3-bis(tert-butylperoxy-isopropyl)benzene, 2,5-dimethyl-2,5-di(benzoyl peroxy)hexane, tert-butylperoxy maleic acid, tert-butylperoxy isopropyl carbonate, etc. As the organic peroxide, a dialkyl peroxide is preferred.

The blend amount of the crosslinking agent is preferably from 0.3 to 10 parts by mass, more preferably from 0.3 to 5 parts by mass, further preferably from 0.5 to 3 parts by mass, to 100 parts by mass of the fluorinated elastic copolymer. When the amount of the crosslinking agent is within the above range, the crosslinked rubber article will be excellent in balance of the strength and the elongation.

In a case where the fluorinated elastic copolymer composition further contains a crosslinking aid, crosslinking efficiency becomes higher.

The crosslinking aid may be triallyl cyanurate, triallyl isocyanurate, trimethallyl isocyanurate, 1,3,5-triacryloyl-hexahydro-1,3,5-triazine, triallyl trimellitate, m-phenylenediamine bismaleimide, p-quinone dioxime, p,p'-dibenzoyl quinone dioxime, dipropargyl terephthalate, diallyl phthalate, N,N',N'',N'''-tetraallyl terephthalamide, a vinyl group-containing siloxane oligomer (polymethyl vinyl siloxane, polymethyl phenyl vinyl siloxane, etc.), etc. As the crosslinking aid, triallyl cyanurate, triallyl isocyanurate or trimethallyl isocyanurate is preferred, and triallyl isocyanurate is particularly preferred.

The blend amount of the crosslinking aid is preferably from 0.1 to 10 parts by mass, more preferably from 0.5 to 5 parts by mass, per 100 parts by mass of the fluorinated elastic copolymer. When the amount of the crosslinking aid falls within the above range, the crosslinked rubber article will be excellent in balance of the strength and the elongation.

Other additives may be a metal oxide, a pigment, a filler, a reinforcing material, a processing aid, etc.

In a case where the fluorinated elastic copolymer composition further contains a metal oxide, a crosslinking reaction will proceed promptly and reliably.

The metal oxide may be an oxide of a divalent metal, such as magnesium oxide, calcium oxide, zinc oxide, lead oxide, etc.

The blend amount of the metal oxide is preferably from 0.1 to 10 parts by mass, more preferably from 0.5 to 5 parts by mass, to 100 parts by mass of the fluorinated elastic copolymer. When the blend amount of the metal oxide is within the above range, the crosslinked rubber article will be excellent in balance of the strength and the elongation.

The filler or reinforcing material may be carbon black, titanium oxide, silicon dioxide, clay, talc, polytetrafluoroethylene, polyvinylidene fluoride, polyvinyl fluoride, polychlorotrifluoroethylene, a TFE/ethylene copolymer, a TFE/propylene copolymer, a TFE/vinylidene fluoride copolymer, etc.

The processing aid may be a known one. The processing aid which expresses a function as a lubricant, may be a fatty acid metal salt (sodium stearate, calcium stearate, etc.), a synthetic wax (polyethylene wax, etc.), a fatty acid ester (glycerol monooleate, etc.), etc.

The fluorinated elastic copolymer composition of the present invention is obtainable by kneading a fluorinated elastic copolymer and a crosslinking agent, and, as the case requires, a crosslinking aid and other additives, by a kneading method using a known kneading apparatus such as a twin roll, a kneader, a Banbury mixer, etc.

Since the fluorinated elastic copolymer composition of the present invention as described above, contains the fluorinated elastic copolymer of the present invention and a crosslinking agent, it is possible to obtain a crosslinked rubber article which has practically sufficient rubber properties and which is also excellent in low-temperature characteristics.

<Crosslinked Rubber Article>

The crosslinked rubber article of the present invention is one obtained by crosslinking the fluorinated elastic copolymer of the present invention or the fluorinated elastic copolymer composition of the present invention.

The crosslinked rubber article may be a crosslinked rubber sheet, an O-ring, a sheet gasket, an oil seal, a diaphragm, a V-ring, a sealing material for a semiconductor manufacturing apparatus, a chemically resistant sealing material, a coating material, an electrical wire coating material, etc.

The tensile strength at break of the crosslinked rubber article is preferably at least 5 MPa, more preferably at least 10 MPa. The elongation at break of the crosslinked rubber article is preferably at least 100%, more preferably at least 150%. TR10 of the crosslinked rubber article is preferably at most $-10°$ C., more preferably at most $-15°$ C.

The crosslinked rubber article of the present invention is obtainable by suitably molding and crosslinking the fluorinated elastic copolymer or fluorinated elastic copolymer composition of the present invention by a known method.

The crosslinking method may be a method by heating, a method by irradiation of ionizing radiation, etc. The molding method may be an injection molding method, an extrusion molding method, a coextrusion molding method, a blow molding method, a compression molding method, an inflation molding method, a transfer molding method, a calendar molding method, etc.

In a case where the fluorinated elastic copolymer composition contains an organic peroxide as a crosslinking agent, crosslinking by heating is preferred.

As a specific production method for the crosslinked rubber article by crosslinking by heating, for example, a hot press molding method may be mentioned. In the hot press molding method, using a heated mold, and filling the fluorinated elastic copolymer composition in a mold cavity having a desired shape, followed by heating, it is possible to obtain a crosslinked rubber article by conducting crosslinking (hot press crosslinking) simultaneously with molding. The heating temperature is preferably from 130 to 220° C., more preferably from 140 to 200° C., further preferably from 150 to 180° C.

In the case of using a hot press molding method, it is also preferred that a crosslinked rubber article obtained by hot press crosslinking (referred to also as primary crosslinking) is further heated in e.g. an oven using electricity, hot air, steam or the like as a heat source, as the case requires, to let the crosslinking be progressed (referred to also as secondary crosslinking). The temperature for the secondary crosslinking is preferably from 150 to 280° C., more preferably from 180 to 260° C., further preferably from 200 to 250° C. The secondary crosslinking time is preferably from 1 to 48 hours, more preferably from 4 to 24 hours. By sufficiently conducting the secondary crosslinking, rubber physical properties of the crosslinked rubber article will be improved. Further, a residue of the peroxide contained in the crosslinked rubber article will be decomposed and volatilized, and thus will be reduced. The hot press molding method is preferably applied to molding of a sealing material or the like.

The ionizing radiation in the method by irradiation of ionizing radiation may be electron beams, gamma rays, etc. In the case of crosslinking by irradiation of ionizing radiation, a method is preferred in which, in advance the fluorinated elastic copolymer or fluorinated elastic copolymer composition is molded into a desired shape, and then the ionizing radiation is irradiated for crosslinking. The molding method may be a method wherein a suspension solution having the fluorinated elastic copolymer or fluorinated elastic copolymer composition dispersed in a suitable solvent, is applied and dried to form a coating film, or a method wherein the fluorinated elastic copolymer or fluorinated elastic copolymer composition is extrusion-molded into a shape of a hose or an electric wire. The irradiation dose of ionizing radiation is suitably set, and is preferably from 1 to 300 kGy, more preferably from 10 to 200 kGy.

Since the crosslinked rubber article of the present invention as described above is one obtained by crosslinking the fluorinated elastic copolymer of the present invention or the fluorinated elastic copolymer composition of the present invention, it has practically sufficient rubber physical properties and at the same time, is excellent in low-temperature characteristics.

EXAMPLES

In the following, the present invention will be described in more detail with reference to Examples, but the present invention is not limited to these Examples. Here, Ex. 4 to 9 are Examples of the present invention, and Ex. 1 to 3 are Comparative Examples.

<Measurements, Evaluations>

(Proportions of the Respective Units in Fluorinated Elastic Copolymer)

Obtained from the $^{19}$F-NMR analysis, the fluorine content analysis and the infrared absorption spectrum analysis.

(Content of iodine atoms in fluorinated elastic copolymer)

Quantified by an apparatus having an automatic sample combustion device (pretreatment apparatus for ion chromatography) (manufactured by Dia Instruments Co., Ltd., AQF-100) and ion chromatograph combined.

(Storage Elastic Modulus G' of Fluorinated Elastic Copolymer)

Using a rubber processing analyzer (manufactured by Alpha Technologies Inc., RPA 2000), in accordance with ASTM D5289 and ASTM D6204, a value measured under conditions of temperature: 100° C., amplitude: 0.5 deg, and frequency: 50 times/minute, was adopted as the storage elastic modulus G'. The storage elastic modulus G' of the fluorinated elastic copolymer is an index for the rubber physical properties of the crosslinked rubber article.

(Tg of Fluorinated Elastic Copolymer)

At the time of heating 10±0.1 mg of a fluorinated elastic copolymer from −70° C. to 50° C. at 10° C./min and cooling it to −70° C. at 10° C./min by using a differential scanning calorimeter (manufactured by Seiko Instruments Inc., DSC7020 model), the center temperature of the endothermic peak change was adopted as the glass transition temperature Tg. Tg of the fluorinated elastic copolymer is an index for the low temperature characteristics of the crosslinked rubber article.

(5% Mass Decrease Temperature of Fluorinated Elastic Copolymer)

At the time of heating a fluorinated elastic copolymer (10 mg) at a temperature-raising rate of 10° C./min in a nitrogen atmosphere by using a differential thermogravimetric simultaneous measurement apparatus (manufactured by Seiko Instruments Inc., TG/DTA7200 model), the temperature at which the mass decrease of the fluorinated elastic copolymer became 5 mass %, was obtained. The 5% mass decrease temperature of the fluorinated elastic copolymer is an index for the heat resistance of the crosslinked rubber article.

(MH-ML of Fluorinated Elastic Copolymer Composition)

Using a crosslinking property measuring instrument (manufactured by Alpha Technologies Inc., RPA), the crosslinking properties were measured under conditions of 12 minutes at 177° C. with an amplitude of 3 degrees. In the crosslinking properties, MH represents the maximum value of the torque, ML represents the minimum value of the torque, and MH-ML represents the degree of crosslinking. The crosslinking properties will be an index for the crosslinking reactivity of the fluorinated copolymer, i.e. the larger the value of MH-ML, the better the crosslinkability.

(Specific Gravities of Fluorinated Elastic Copolymer and Crosslinked Rubber Article)

Using a specific gravity meter (manufactured by Shinko Denshi), the specific gravities were measured in accordance with JIS K6220-1.

(Tensile Strength at Break of Crosslinked Rubber Article)

Using a tester (manufactured by Ueshima Seisakusho Co., Ltd., Quick Leader), the tensile strength at break was measured in accordance with JIS K6251: 2010 (corresponding to International Standard ISO 37: 2005).

(Elongation at Break of Crosslinked Rubber Article)

Using a tester (manufactured by Ueshima Seisakusho Co., Ltd., Quick Leader), the elongation at break was measured in accordance with JIS K6251: 2010 (corresponding to International Standard ISO 37: 2005).

(Tensile Stress of Crosslinked Rubber Article)

Using a tester (manufactured by Ueshima Seisakusho Co., Ltd., Quick Leader), the tensile stress at 100% elongation was measured in accordance with JIS K6251: 2010 (corresponding to International Standard ISO 37: 2005).

(Hardness of Crosslinked Rubber Article)

Using an automatic hardness meter for rubber (manufactured by H Barleys Co., Digitest), Type A durometer hardness was measured in accordance with JIS K6253-1: 2012 (corresponding to International Standard ISO 18517: 2005).

(TR10 of Crosslinked Rubber Article)

Using a TR tester (manufactured by Yasuda Seiki Seisakusho, Ltd., No. 145-L), in accordance with the low temperature elastic recovery test (TR test) as described in JIS K6261: 2006 (corresponding to International Standard ISO 2921: 1982), the temperature TR10 at which a test specimen frozen at a low temperature (from −70 to −73° C.) in an elongated state, recovers the elasticity along with an increase of the temperature, and its shrinkage reaches 10%, was obtained.

<Production of EEEAVE>

Using $CH_3CH_2(OCH_2CH_2)_3OH$ and $F(CF_2)_3OCF(CF_3)CF_2OCF(CF_3)COF$ as starting materials, by the liquid phase fluorination method and KF pyrolysis method as described in WO00/56694, $CF_3CF_2(OCF_2CF_2)_2OCF_2COF$ was obtained. Further, an adduct of $CF_3CF_2(OCF_2CF_2)_2OCF_2COF$ and hexafluoropropylene oxide was obtained, and the adduct was subjected to a thermal decomposition reaction, to obtain EEEAVE.

$^{19}$F-NMR data of EEEAVE are shown below.

$^{19}$F-NMR (282.7 MHz, solvent: $CDCl_3$, reference: $CFCl_3$) δ (ppm): −87.1 (3F), −87.7 (2F), −88.4 (10F), −90.4 (2F), −115.4 (1F), −122.6 (1F), −135.7 (1F).

<Production of Fluorinated Elastic Copolymer>

Ex. 1

After degassing a stainless steel pressure reactor having an internal volume of 2,100 mL provided with an anchor blade, 804 g of ultrapure water, 80.1 g of a 30 mass % solution of $C_2F_5OCF_2CF_2OCF_2COONH_4$, 0.72 g of C3DVE, 1.8 g of a 5 mass % aqueous solution of disodium hydrogen phosphate 12 hydrate, and 0.87 g of 1,4-diiodoperfluorobutane were charged, and the gas phase was replaced with nitrogen. While stirring at a speed of 600 rpm by using the anchor blade, after the internal temperature became 80° C., 13 g of TFE and 65 g of PMVE were injected into the container. The internal pressure in the reactor was 0.90 MPa. 20 mL of a 1 mass % aqueous solution of ammonium persulfate was added to initiate polymerization. When the addition ratio of monomers injected before initiation of the polymerization (hereinafter referred to as the initial monomers) was represented by a molar ratio, TFE:PMVE:C3DVE=25:74.81:0.19.

Along with the progress of the polymerization, at the time when the internal pressure of the reactor was decreased to 0.89 MPa, TFE was injected to raise the internal pressure of the reactor to 0.90 MPa. This operation was repeated, and every time when 8 g of TFE was injected, 7 g of PMVE was also injected.

At the time when the total addition mass of TFE became 80 g, addition of the monomers injected after initiation of the polymerization (hereinafter referred to as post-addition monomers) was terminated, and the internal temperature of the reactor was cooled to 10° C., to terminate the polymerization reaction and to obtain a latex containing a fluorinated elastic copolymer. The polymerization time was 185 minutes. The total added masses of the post-addition monomers were such that TFE was 80 g and PMVE was 63 g, and when they were converted to a molar ratio, TFE:PMVE=65:35.

The latex was added to a 5 mass % aqueous solution of aluminum potassium sulfate, to coagulate and separate the fluorinated elastic copolymer. The fluorinated elastic copolymer was filtered, washed with ultrapure water and vacuum-dried at 50° C., to obtain a white fluorinated elastic copolymer. The results are shown in Table 1.

Ex. 2

After degassing a stainless steel pressure reactor having an internal volume of 2,100 mL provided with an anchor blade, 900 g of ultrapure water, 60 g of a 30 mass % solution of $C_2F_5OCF_2CF_2OCF_2COONH_4$, 123 g of C9PEVE, 1.6 g of a 5 mass % aqueous solution of disodium hydrogen phosphate 12 hydrate and 0.57 g of 1,4-diiodoperfluorobutane were charged, and the gas phase was replaced with nitrogen. While stirring at a speed of 600 rpm by using an anchor blade, after the internal temperature became 80° C., 15 g of TFE and 38 g of PMVE were injected into the container. The internal pressure of the reactor was 0.54 MPa. 20 mL of a 2.5 mass % aqueous solution of ammonium persulfate was added to initiate polymerization. When the addition ratio of the initial monomers was represented by a molar ratio, TFE:PMVE:C9PEVE=25:38:37.

Along with the progress of the polymerization, at the time when the internal pressure of the reactor was decreased to 0.45 MPa, TFE was injected to raise the internal pressure of the reactor to 0.54 MPa. This operation was repeated, and every time when 8 g of TFE was injected, 7.5 g of C9PEVE was also injected. Further, every time when 16 g of TFE was injected, 7 g of PMVE was also injected.

At the time when the total addition mass of TFE became 64 g, addition of the post-addition monomers was terminated, and the internal temperature of the reactor was decreased to 10° C., to terminate the polymerization reaction and to obtain a latex containing a fluorinated elastic copolymer. The polymerization time was 270 minutes. The total added mass of the post-addition monomers were such that TFE was 64 g, PMVE was 28 g, and C9PEVE was 90 g, and when they were converted to a molar ratio, TFE:PMVE:C9PEVE=66:17:17.

In the same manner as in Ex. 1, the fluorinated elastic copolymer was recovered from the latex. The results are shown in Table 1.

Ex. 3

After degassing a stainless steel pressure reactor having an internal volume of 2,100 mL provided with an anchor blade, 804 g of ultrapure water, 80.1 g of a 30 mass % solution of $C_2F_5OCF_2CF_2OCF_2COONH_4$, 65 g of C7PEVE, 1.8 g of a 5 mass % aqueous solution of disodium hydrogen phosphate 12 hydrate and 0.5 g of 1,4-diiodoperfluorobutane, were charged, and the gas phase was replaced with nitrogen. While stirring at a speed of 600 rpm by using an anchor blade, after the internal temperature became 80° C., 25 g of TFE and 45 g of PMVE were injected into the container. The internal pressure of the reactor was 0.90 MPa. 20 mL of a 1 mass % aqueous solution of ammonium persulfate was added to initiate polymerization. When the addition ratio of the initial monomers was represented by a molar ratio, TFE:PMVE:C7PEVE=37:40:23.

Along with the progress of the polymerization, at the time when the internal pressure of the reactor was decreased to 0.89 MPa, TFE was injected to raise the internal pressure of the reactor to 0.90 MPa. This operation was repeated, and every time when 7.2 g of TFE was injected, 4.2 g of PMVE was also injected.

At the time when the total addition mass of TFE became 72 g, addition of the post-addition monomers was terminated, and the internal temperature of the reactor was cooled to 10° C. to terminate the polymerization reaction and to obtain a latex containing a fluorinated elastic copolymer. The polymerization time was 150 minutes. The total added masses of the post-addition monomers were such that TFE was 72 g, and PMVE was 38 g, and when they were converted to a molar ratio, TFE:PMVE=74:26.

In the same manner as in Ex. 1, the fluorinated elastic copolymer was recovered from the latex. The results with respect to the fluorinated elastic copolymer are shown in Table 1.

Ex. 4

A fluorinated elastic copolymer was obtained in the same manner as in Ex. 3, except that 0.72 g of C3DVE was added to the initial monomers, the internal pressure of the reactor was changed to 0.96 MPa, and the polymerization time was changed to 80 minutes. When the addition ratio of the initial monomers was represented by a molar ratio, TFE:PMVE:C7PEVE:C3DVE=36.90:39.91:23:0.19. The results with respect to the fluorinated elastic copolymer are shown in Table 1.

Ex. 5

A fluorinated elastic copolymer was obtained in the same manner as in Ex. 4, except that the charges of the initial monomers were changed to 14 g of TFE, 64 g of PMVE, 106 g of C9PEVE and 0.72 g of C3DVE, the total addition masses of the post-addition monomers were changed to 78 g of TFE and 56 g of PMVE, and the polymerization time was changed to 170 minutes. When the addition ratio of the initial monomers was represented by a molar ratio, TFE:PMVE:C7PEVE:C3DVE=19:53.83:27:0.17, and when the addition ratio of the post-addition monomers was represented by a molar ratio, TFE:PMVE=67:33. The results with respect to the fluorinated elastic copolymer are shown in Table 1.

Ex. 6

A fluorinated elastic copolymer was obtained in the same manner as in Ex. 4, except that in the charges of the initial monomers, C3DVE was changed to 0.94 g and 1,4-diiodoperfluorobutane was changed to 0.60 g, the internal pressure of the reactor was changed to 0.97 MPa, and the polymerization time was changed to 125 minutes. When the addition ratio of the initial monomers was represented by a molar ratio, TFE:PMVE:C7PEVE:C3DVE=36.90:39.86:23:0.24. The results with respect to the fluorinated elastic copolymer are shown in Table 1.

Ex. 7

A fluorinated elastic copolymer was obtained in the same manner as in Ex. 4 except that the charges of the initial monomers were changed to 26 g of TFE, 45 g of PMVE, 54 g of C7PEVE and 1.32 g of C3DVE, 1,4-diiodoperfluorobutane was changed to 0.60 g, the total addition masses of the post-addition monomers were changed to 83 g of TFE and 40 g of PMVE, the internal pressure of the reactor was changed to 0.90 MPa, and the polymerization time was changed to 150 minutes. When the addition ratio of the initial monomers was represented by a molar ratio, TFE:PMVE:C7PEVE:C3DVE=38.90:40.86:20:0.24, and when the addition ratio of the post-addition monomers was represented by a molar ratio, TFE:PMVE=76:24. The results with respect to the fluorinated elastic copolymer are shown in Table 1.

Ex. 8

A fluorinated elastic copolymer was obtained in the same manner as in Ex. 4, except that the charges of the initial monomers were changed to 25 g of TFE, 45 g of PMVE, 88.1 g of EEEAVE and 1.17 g of C3DVE, 1,4-diiodoperfluorobutane was changed to 0.60 g, the total addition masses of the post-addition monomers were changed to 71 g of TFE and 37 g of PMVE, the internal pressure of the reactor was changed to 0.90 MPa, and the polymerization time was changed to 150 minutes. When the addition ratio of the initial monomers was represented by a molar ratio, TFE:PMVE:EEEAVE:C3DVE=36.9:39.86:23:0.24, and when the addition ratio of the post-addition monomers was represented by a molar ratio, TFE:PMVE=76:24. The results with respect to the fluorinated elastic copolymer are shown in Table 1.

Ex. 9

A fluorinated elastic copolymer was obtained in the same manner as in Ex. 4, except that the charges of the initial monomers were changed to 25 g of TFE, 45 g of PMVE, 93.0 g of EEAVE and 1.23 g of C3DVE, 1,4-diiodoperfluorobutane was changed to 0.60 g, the total addition masses of the post-addition monomers were changed to 74 g of TFE and 34 g of PMVE, the internal pressure of the reactor was changed to 0.90 MPa, and the polymerization time was changed to 240 minutes. When the addition ratio of the initial monomers was represented by a molar ratio, TFE:PMVE:EEAVE:C3DVE=33.9:37.86:28:0.24, and when the addition ratio of the post-addition monomers was represented by a molar ratio, TFE:PMVE=76:24. The results with respect to the fluorinated elastic copolymer are shown in Table 1.

<Production of Fluorinated Elastic Copolymer Composition>

100 parts by mass of the fluorinated elastic copolymer in Ex. 1, 15 parts by mass of carbon black, 3 parts by mass of triallyl isocyanurate, 1 part by mass of 2,5-dimethyl-2,5-di(tert-butylperoxy)hexane (Perhexa (trade name of NOF Corp.) 25B), and 1 part by mass of calcium stearate were kneaded by a twin roll, to obtain a fluorinated elastic copolymer composition in Ex. 1. Also with respect to the fluorinated elastic copolymers in Ex. 2 to 9, fluorinated elastic copolymer compositions in Ex. 2 to 9 were obtained in the same manner. The results of MH-ML of the fluorinated elastic copolymer compositions are shown in Table 1.

<Production of Crosslinked Rubber Article>

With respect to the fluorinated elastic copolymer composition in Ex. 1, hot pressing (primary crosslinking) was conducted at 150° C. for 20 minutes, and then, secondary crosslinking for 4 hours was conducted in an oven at 250° C., to obtain a crosslinked rubber sheet with a thickness of 2 mm. The crosslinked rubber sheet was punched out by a No. 3 dumbbell, to obtain a test specimen of Ex. 1.

Also with respect to the fluorinated elastic copolymer compositions in Ex. 2 to 4, test specimens of Ex. 2 to 4 were obtained in the same manner as in Ex. 1. With respect to the fluorinated elastic copolymer compositions in Ex. 5 to 9, test specimens of Ex. 5 to 9 were obtained in the same manner as in Ex. 1, except that the temperature for the secondary crosslinking was changed to 200° C. The results with respect to the test specimens are shown in Table 1

TABLE 1

| | | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| Proportion of units | TFE | TFE | mol % | 65.9 | 76.2 | 69.3 | 71.4 | 66.9 | 69.56 | 71.16 | 70.06 | 72.4 |
| | PAVE | PMVE | mol % | 34 | 21.4 | 22 | 20 | 30.3 | 20.7 | 19.9 | 26.6 | 15.2 |
| | POAVE | C9PEVE | mol % | — | 2.4 | — | — | 2.7 | — | — | — | — |
| | | C7PEVE | mol % | — | — | 8.7 | 8.5 | — | 9.6 | 8.8 | — | — |
| | | EEEAVE | mol % | — | — | — | — | — | — | — | 3.2 | — |
| | | EEAVE | mol % | — | — | — | — | — | — | — | — | 12.4 |
| | DVE | C3DVE | mol % | 0.1 | — | — | 0.1 | 0.1 | 0.14 | 0.14 | 0.14 | 0.1 |
| Content of iodine atoms | | | mass % | 0.34 | 0.17 | 0.16 | 0.16 | 0.13 | 0.14 | 0.19 | 0.17 | 0.17 |
| Rubber physical properties | Storage elastic modulus G' | | kPa | 560.5 | — | 183 | 256.7 | 426 | 243 | 289 | 396 | 374 |
| | Specific gravity of elastic copolymer | | g/cm$^3$ | 2.052 | — | 2.006 | — | 2.031 | 2.017 | — | — | — |
| | Specific gravity of crosslinked rubber article | | g/cm$^3$ | 2 | — | — | 1.98 | 1.978 | 1.96 | 1.988 | 1.978 | — |
| | MH-ML | | — | 118.5 | — | — | 43.7 | 89.3 | 56.8 | 61.7 | 114 | 59.1 |
| | Tensile strength at break | | MPa | 23 | 8.3 | — | 11.7 | 17.7 | 12 | 13.1 | 18.7 | 12.6 |
| | Elongation at break | | % | 192 | 384 | — | 346 | 192 | 200 | 179 | 154 | 167 |
| | Tensile stress | | MPa | 9 | — | — | 2.4 | 6 | 4.4 | 5.5 | 10.1 | 5.4 |
| | Hardness | | shore A | 80 | 73 | — | 66 | 71 | 69 | 72 | 75 | 72 |
| Low temperature characteristics | Tg | | ° C. | −3 | −13 | −25 | −23 | −16 | −26 | −23 | −11.6 | −25 |
| | TR10 | | ° C. | −1.9 | −6.8 | — | −19 | −10.4 | −20.8 | −19.6 | −7.6 | −19 |
| Heat resistance | 5% mass decrease temperature | | ° C. | 448.3 | 400 | — | 442 | 423 | 439 | 425 | 428 | 436 |

The fluorinated elastic copolymer in Ex. 1 which corresponds to the fluorinated elastic copolymer as described in Patent Document 1, was insufficient in the low temperature characteristics, although it was good in the storage elastic modulus G' and the tensile strength when made into a crosslinked rubber article.

The fluorinated elastic copolymer in Ex. 2 which corresponds to the fluorinated elastic copolymer as described in Patent Document 2, was insufficient in tensile strength when made into a crosslinked rubber article, and with respect to the low-temperature characteristics, although Tg was low, TR10 was insufficient.

Ex. 3 is an example wherein the proportion of POAVE was increased for the purpose of lowering the TR10. The storage elastic modulus G' was too low to conduct molding.

Ex. 4 to 9 are examples for a combination of POAVE units and DVE units. It was possible to obtain a crosslinked rubber article which had practically sufficient rubber properties, and which was also excellent in low temperature characteristics.

INDUSTRIAL APPLICABILITY

The fluorinated elastic copolymer of the present invention can be used for normal rubber products, and since it is excellent in low temperature characteristics, in particular, it can be used for an O-ring, sheet gasket, oil seal, diaphragm, V-ring, etc. to be used in a low-temperature environment. Further, it can be suitably used for a sealing material for a semiconductor manufacturing apparatus, a chemically resistant sealant, a coating material, an electric wire coating material, etc. Further, it is applicable also to a corrosion-resistant rubber coating, an anti-urea grease sealing material, a rubber coating material, an adhesive rubber, a hose, a tube, a calendar sheet (roll), a sponge, a rubber roll, an oil drilling member, a heat dissipation sheet, a solution crosslinked product, a rubber sponge, a bearing seal (an anti-urea grease), a lining (anti-chemical), an automotive insulation sheet, an insulating sheet for electronic apparatus, a rubber band for a watch, an endoscopic packing (amine resistant), a bellows hose (processed from a calendar sheet), water heater packing/valve, a fender (marine civil engineering, ships), fibers-nonwoven fabric (protective clothing, etc.), a base sealant, rubber gloves, a stator for an uniaxial eccentric screw pump, parts for a urea SCR system, an anti-vibration agent, a vibration damping agent, a sealing agent, an additive to other materials, and application to a toy.

This application is a continuation of PCT Application No. PCT/JP2018/025073, filed on Jul. 2, 2018, which is based upon and claims the benefit of priority from Japanese Patent Application No. 2017-131931 filed on Jul. 5, 2017. The contents of those applications are incorporated herein by reference in their entireties.

What is claimed is:

1. A fluorinated elastic copolymer comprising:
units based on tetrafluoroethylene,
units based on a compound (1) $CF_2=CFOCF_3$ (PMVE);
units based on a compound (2) selected from the group consisting of
$CF_2=CF-(OCF_2CF_2)_2-OCF_2CF_3$ (EEAVE),
$CF_2=CF-OCF_2CF_2-(OCF_2)_2-OCF_3$ (C7PEVE),
$CF_2=CF-(OCF_2CF_2)_3-OCF_2CF_3$ (EEEAVE), and
$CF_2=CF-OCF_2CF_2-(OCF_2)_4-OCF_3$ (C9PEVE);
units based on a fluorinated monomer having at least two polymerizable unsaturated bonds, wherein the fluorinated monomer having at least two polymerizable unsaturated bonds is $CF_2=CFO(CF_2)_3OCF=CF_2$ (C3DVE); and
optionally units (e) based on a monomer other than tetrafluoroethylene, the compound (1), the compound (2), and the fluorinated monomer having at least two polymerizable unsaturated bonds,
wherein
the proportion of tetrafluoroethylene units is from 40 to 75 mol %,
the proportion of units based on the compound (1) is from 10 to 40 mol %,
the proportion of units based on the compound (2) is from 2 to 20 mol %,
the proportion of units based on a fluorinated monomer having at least two polymerizable unsaturated bonds is from 0.1 to 0.5 mol %, and
the proportion of units (e) is from 0 to 5 mol %,
to the total of all units in the fluorinated elastic copolymer.

2. The fluorinated elastic copolymer according to claim 1, which further comprises iodine atoms.

3. The fluorinated elastic copolymer according to claim 1, wherein the molar ratio of the above units based on tetrafluoroethylene to the above units based on the compound (1) is from 60/40 to 85/15.

4. The fluorinated elastic copolymer according to claim 1, which comprises iodine atoms in an amount of from 0.01 to 1.5 mass % in 100 mass % of the fluorinated elastic copolymer.

5. The fluorinated elastic copolymer according to claim 1, of which the storage modulus G' is from 100 to 600 kPa, and Tg is from −40 to −15° C.

6. A fluorinated elastic copolymer composition comprising the fluorinated elastic copolymer as defined in claim 1 and a crosslinking agent.

7. The fluorinated elastic copolymer composition according to claim 6, which comprises the crosslinking agent in an amount of from 0.3 to 10 parts by mass to 100 parts by mass of the fluorinated elastic copolymer.

8. The fluorinated elastic copolymer composition according to claim 6, wherein the crosslinking agent is an organic peroxide.

9. A crosslinked rubber article obtained by crosslinking the fluorinated elastic copolymer as defined in claim 1.

10. A crosslinked rubber article obtained by crosslinking the fluorinated elastic copolymer composition as defined in claim 8.

11. The crosslinked rubber article according to claim 9, of which the tensile strength at break is at least 5 MPa, the elongation at break is at least 100%, and TR10 is at most −10° C.

12. The crosslinked rubber article according to claim 10, of which the tensile strength at break is at least 5 MPa, the elongation at break is at least 100%, and TR10 is at most −10° C.

13. A method for producing a fluorinated elastic copolymer, which comprises polymerizing monomer components comprising:
tetrafluoroethylene;
units based on a compound (1) $CF_2=CFOCF_3$ (PMVE);
units based on a compound (2) selected from the group consisting of
$CF_2=CF-(OCF_2CF_2)_2-OCF_2CF_3$ (EEAVE),
$CF_2=CF-OCF_2CF_2-(OCF_2)_2-OCF_3$ (C7PEVE),
$CF_2=CF-(OCF_2CF_2)_3-OCF_2CF_3$ (EEEAVE), and
$CF_2=CF-OCF_2CF_2-(OCF_2)_4-OCF_3$ (C9PEVE);

units based on a fluorinated monomer having at least two polymerizable unsaturated bonds, wherein the fluorinated monomer having at least two polymerizable unsaturated bonds is $CF_2=CFO(CF_2)_3OCF=CF_2$ (C3DVE); and optionally units (e) based on a monomer other than tetrafluoroethylene, the compound (1), the compound (2), and the fluorinated monomer having at least two polymerizable unsaturated bonds, wherein the proportion of tetrafluoroethylene units is from 40 to 75 mol %, the proportion of units based on the compound (1) is from 10 to 40 mol %, the proportion of units based on the compound (2) is from 2 to 20 mol %, the proportion of units based on a fluorinated monomer having at least two polymerizable unsaturated bonds is from 0.1 to 0.5 mol %, and the proportion of units (e) is from 0 to 5 mol %, to the total of all units in the fluorinated elastic copolymer.

14. The method for producing a fluorinated elastic copolymer according to claim 13 wherein said monomer components are polymerized in the presence of said radical polymerization initiator and a compound represented by the following formula (4), $$R^{f4}I_2 \qquad (4)$$

wherein $R^{f4}$ is a $C_{1-16}$ polyfluoroalkylene group.

15. The method for producing a fluorinated elastic copolymer according to claim 13, wherein said monomer components are polymerized in an aqueous medium comprising an emulsifier.

16. The fluorinated elastic copolymer according to claim 1, wherein the compound (2) is EEAVE or C7PEVE, and the fluorinated monomer having at least two polymerizable unsaturated bonds is C3DVE.

* * * * *